United States Patent
Kato et al.

(10) Patent No.: US 8,815,064 B2
(45) Date of Patent: *Aug. 26, 2014

(54) OZONE GENERATOR

(75) Inventors: Masaaki Kato, Okayama (JP); Rie Kawaguchi, Okayama (JP); Takamichi Kishi, Okayama (JP)

(73) Assignee: Permelec Electrode Ltd., Kanagawa (JP)

( * ) Notice: Subject to any disclaimer, the term of this patent is extended or adjusted under 35 U.S.C. 154(b) by 231 days.
This patent is subject to a terminal disclaimer.

(21) Appl. No.: 13/393,484

(22) PCT Filed: Nov. 26, 2010

(86) PCT No.: PCT/JP2010/071159
§ 371 (c)(1),
(2), (4) Date: Feb. 29, 2012

(87) PCT Pub. No.: WO2011/070926
PCT Pub. Date: Jun. 16, 2011

(65) Prior Publication Data
US 2012/0168302 A1      Jul. 5, 2012

(30) Foreign Application Priority Data

Dec. 7, 2009   (JP) .................................. 2009-277373

(51) Int. Cl.
| | |
|---|---|
| C25B 1/13 | (2006.01) |
| C25B 13/02 | (2006.01) |
| C25B 13/08 | (2006.01) |
| C25B 11/12 | (2006.01) |
| C25B 9/08 | (2006.01) |
| C01B 13/11 | (2006.01) |
| C02F 1/461 | (2006.01) |
| C25B 11/04 | (2006.01) |
| C02F 103/02 | (2006.01) |

(52) U.S. Cl.
CPC . *C25B 13/02* (2013.01); *C25B 1/13* (2013.01); *C01B 13/11* (2013.01); *C01B 2201/24* (2013.01); *C01B 2201/34* (2013.01); *C02F 1/4618* (2013.01); *C02F 2001/46138* (2013.01); *C02F 2103/02* (2013.01); *C02F 2201/46115* (2013.01); *C25B 9/08* (2013.01); *C25B 11/0478* (2013.01); *C25B 13/08* (2013.01); *Y02E 60/366* (2013.01)
USPC ....... 204/252; 204/284; 204/290.15; 205/626

(58) Field of Classification Search
USPC ........................................................ 205/626
See application file for complete search history.

(56) References Cited

U.S. PATENT DOCUMENTS

| | | | | |
|---|---|---|---|---|
| 7,090,753 | B2 * | 8/2006 | Sumita | 204/263 |
| 8,277,623 | B2 * | 10/2012 | Kato et al. | 204/294 |

(Continued)

FOREIGN PATENT DOCUMENTS

JP         2005-240074         9/2005

(Continued)

OTHER PUBLICATIONS

Official Journal of the European Union: Directive 2002/95/EC of the European Parliament and the Council of Jan. 27, 2003 on the restriction of the use of certain hazardous substances in electrical and electronic equipment, pp. L37/19 to 37/23.

*Primary Examiner* — Harry D Wilkins, III
(74) *Attorney, Agent, or Firm* — Hamre, Schumann, Mueller & Larson, P.C.

(57) ABSTRACT

The present invention provides an ozone generator comprising an anode and a cathode provided on each side of a fluororesin type cation exchange membrane, the anode being a conductive diamond electrode having conductive diamond on the surface, wherein water is supplied to an anode compartment, DC current is supplied between the anode and the cathode to electrolyze water to evolve ozone from the anode compartment and hydrogen from a cathode compartment, the conductive diamond electrode comprising a substrate having a plurality of convexo-concave and a conductive diamond film coated on the surface of the substrate is applied as the conductive diamond electrode, and a close packed layer of ion exchange resin particles or the fluororesin type cation exchange membrane with notch is closely adhered to the surface of the anode side of the fluororesin type cation exchange membrane.

7 Claims, 9 Drawing Sheets

(56) References Cited

U.S. PATENT DOCUMENTS

| | | | |
|---|---|---|---|
| 2003/0056805 A1* | 3/2003 | Sumita | 134/1.3 |
| 2005/0186345 A1 | 8/2005 | Shibata et al. | |
| 2008/0053840 A1* | 3/2008 | Arihara et al. | 205/626 |
| 2008/0264780 A1* | 10/2008 | Kato et al. | 204/252 |
| 2010/0006450 A1* | 1/2010 | Whitehead et al. | 205/742 |
| 2010/0089765 A1* | 4/2010 | Arihara et al. | 205/626 |
| 2010/0320082 A1* | 12/2010 | Kato et al. | 204/266 |

FOREIGN PATENT DOCUMENTS

| | | | |
|---|---|---|---|
| JP | 2007-070701 | | 3/2007 |
| JP | 2007-246940 | * | 9/2007 |
| JP | 2009-007655 | | 1/2009 |
| WO | WO 2008/056336 A1 | * | 5/2008 |

\* cited by examiner

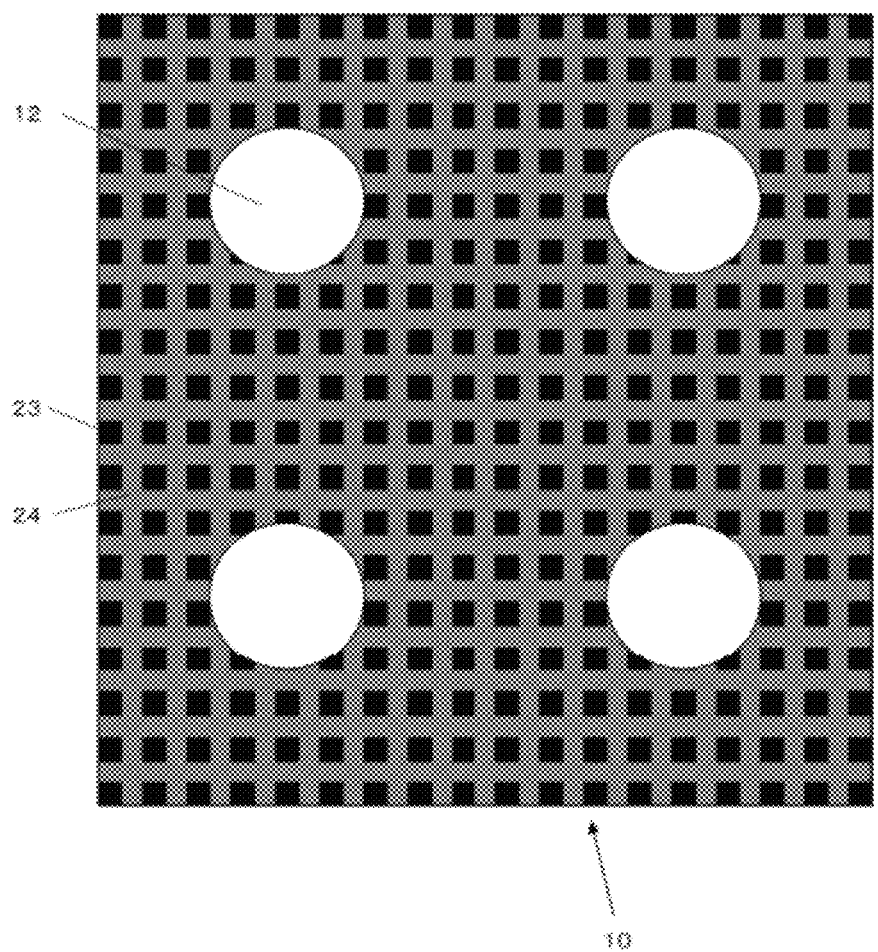

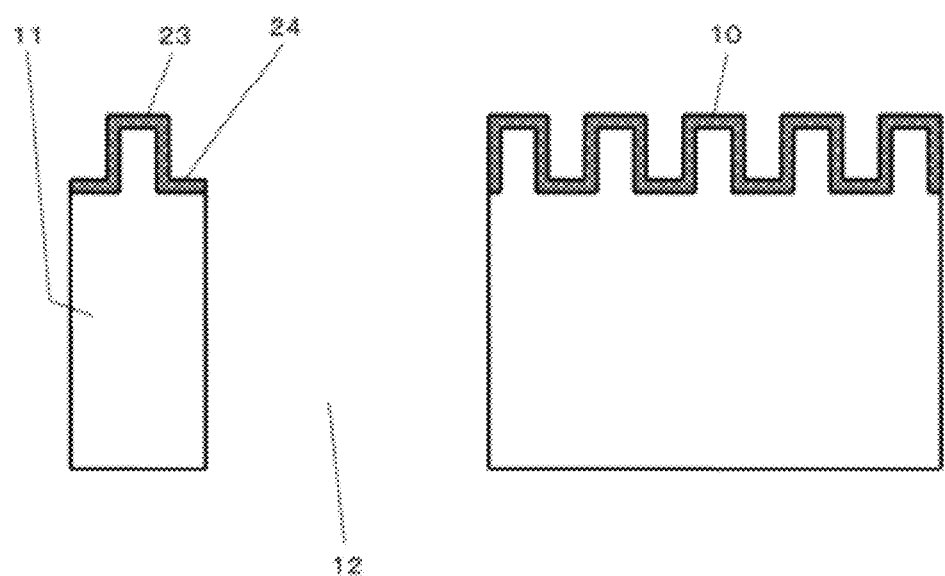

OZONE GENERATOR

BACKGROUND OF THE INVENTION

The present invention relates to an ozone generator, wherein an anode and a cathode are closely adhered to each face of the fluororesin type cation exchange membrane, an electrode having conductive diamond on its surface is used as the anode, water is electrolyzed to evolve ozone from the anode and hydrogen from the cathode.

Ozone is known as a substance, in the nature, having an extremely strong oxidizing power and has been widening its applications over various industries. For instance, ozone is utilized in waterworks and sewage plants for the sterilizing and decolorizing treatments. Another advantage of ozone is the nature that it turns to harmless oxygen through autolysis with time lapse. Ozone, therefore, is appreciated as a chemical used for sterilizing and decolorizing processes which are easier and safer in handling than the former processes by chemicals, without secondary contamination by chemical residues or reaction by-products, offering an easy post-treatment.

Well known methods of ozone production include the UV lamp process, the silent discharge process, and the electrolysis process.

The UV lamp process produces ozone through exciting oxygen by UV rays, available from a relatively simple unit, but the production volume is small and the application area is limited to deodorizing rooms and cars.

The silent discharge process is one of the most prevalent and commonly used ozone generation methods. It is widely applied for various purposes ranging from simple room deodorizing by a small-scale ozonizer to industrial water treatment by a large-scale ozonizer with an output capacity of several tens kilograms per hour. The silent discharge process uses oxygen gas or oxygen in air as feed material, and generates ozone through excitation by electric discharge.

The electrolysis process generates ozone in the generated anodic gas through electrolysis of water. Ozone gas can be obtained also through the electrolysis of aqueous solutions including that of sulfuric acid; however, if the electrolysis is carried out with ultrapure water as raw material applying a fluororesin type cation exchange membrane, highly concentrated and purified ozone is obtained. The ozone production system by ultrapure water electrolysis has been widely used in the precision cleaning fields such as for semiconductor wafers or LCD substrates, since it applies ultrapure water as raw material and the generated gas contains impurities at an extremely low level.

Conventionally, lead dioxide (PbO2) deposited on the conductive porous metals including titanium by such means as electrolytic plating has been utilized as an anode for the electrolytic ozone process for its superior current efficiency in ozone gas generation. When ultrapure water is electrolyzed at a room temperature in a cell with perfluorosulfonic acid ion exchange membrane and the lead dioxide applied as the anode, the current efficiency in ozone generation is usually 10-15%, even as high as 20% at a high current density. Although perfluorosulfonic acid ion exchange membrane is consumed with time during electrolysis, the amount of consumption is small, and therefore, a constant ozone output and operation safety can be maintained in more than two consecutive years of electrolysis run.

As above-mentioned, the lead dioxide anode shows a high current efficiency in ozone generation under a high current density and in continuous electrolysis operation, as well as good long-term stability, but the lead dioxide anode is susceptible to be reduced and deteriorative in a reducing environment. For instance, in a suspension of electrolysis operation, the lead dioxide on the electrode surface is easily reduced to lead hydroxide ($Pb(OH)_2$), lead oxide (PbO) or lead ion ($Pb^{2+}$) through reactions with reducing materials including hydrogen remaining in the electrolytic cell or the electrolytic reducing reaction from cathodic polarization. Since these reduced substances have neither ozone generation ability nor electronic conductivity, such phenomenon is observed that the ozone generation capacity decreases in a resumed operation after suspension.

Therefore, the electrolytic ozone generator system applying lead dioxide electrodes usually has a mechanism to supply protective current in a range of $1/10$-$1/1000$ of electrolysis current normally applied to the electrolytic cell, to avoid performance deterioration during a cease of operation. Such mechanism, composed of a DC power source dedicated to the protective current supply, a battery, and a control system which constantly monitors state of the electrolytic cell so that no-current state does not occur even instantaneously. By this mechanism, lead dioxide anodes are protected from being exposed to a reducing environment even during the electrolysis operation cease; however, provision of such mechanism results in complicated working mechanism and configuration of the electrolytic ozone generator system, leading to a higher equipment costs.

Moreover, the lead dioxide anode contains a good amount of lead. Nowadays, use of lead tends to be reduced in all industrial commodities for its toxicity and legislative regulations, such as ROHS guide line. (Refer to Non-patent Document 1.)

On the other hand, it is known that the water electrolysis using conductive diamond as anode, where its conductivity has been induced by dopant such as boron added in the crystal structure, gives a current efficiency as high as 40% in terms of ozone output, which is far higher than the electrolysis using the lead dioxide anode. Moreover, the conductive diamond anode is superior in chemical and electrochemical stability and gives no change in property and electrolytic performance even in the reducing environment where lead dioxide changes in quality and degrades. Accordingly, the protective current mechanism, which is essential in the electrolytic ozone generator system using lead dioxide anodes, is not required, leading to a simple equipment design. As a matter of fact, neither carbon nor boron, constituting the conductive diamond is the object materials in the ROHS guide line.

However, it has been revealed that the conductive diamond electrode has a very strong oxidation capacity and therefore, if water electrolysis is conducted in the same manner as with the conventional electrolytic ozone generation cell, in which the conductive diamond electrode is made in contact with perfluorosulfonic acid ion exchange membrane, the consumption rate of perfluorosulfonic acid ion exchange membrane becomes more than 100 times compared with the case of the lead dioxide electrode. A rapid thinning of membrane by electrolysis operation leads to an abrupt increase in permeation of hydrogen gas evolved in the cathode compartment into the anode compartment, causing the concentration of hydrogen in the anode gas to excel the low limit of hydrogen explosion even in a short period of electrolysis, resulting in an electrolytic cell with an extremely short time of safety electrolytic operation. Accordingly, even if the conductive diamond electrode features excellent ozone generation capacity, commercial application in an electrolytic cell for ozone generator has been difficult.

Conventionally, in the ozone generation method in which an anode and a cathode are closely adhered to each face of the fluororesin type cation exchange membrane, an electrode having conductive diamond on its surface is used as the anode, water is electrolyzed to evolve ozone from the anode and hydrogen from the cathode, the consumption of fluororesin type cation exchange membrane is reportedly restricted by controlling electric current supply or by inclusion of reinforcing materials in the fluororesin type cation exchange membrane. (Refer to Patent Literature 1)

However, in this method, the current supply to the electrolytic cell is restricted to below the value at which the ozone generation efficiency reaches maximum, causing the controlling range of ozone output by the equipment in this electrolysis method to be narrow. Moreover, reinforcing materials contained in the fluororesin type cation exchange membrane will be exposed from the fluororesin type cation exchange membrane which has been consumed with time and made in contact with the conductive diamond electrode, causing electric current to be supplied no more at that time since reinforcing materials have no conductivity, resulting in no ozone output. In this case, the life span of the electrolytic cell is estimated to be the time up until the thickness from the surface of the fluororesin type cation exchange membrane to the reinforcing material has been consumed.

LITERATURE OF RELATED ART

Patent Literature

[Patent Literature 1]
Japanese Unexamined Patent Application Publication No. 2009-7655

Non-Patent Literature

[Non-Patent Literature 1]
DIRECTIVE 2002/95/EC OF THE EUROPEAN PARLIAMENT AND OF THE COUNCIL of 27 Jan. 2003 on the restriction of the use of certain hazardous substances in electrical and electronic equipment (RoHS)

SUMMARY OF THE INVENTION

Problem to be Solved by the Invention

The present invention intends to solve problems of the conventional processes and to provide an ozone generator, wherein an anode and a cathode are closely adhered to each face of the fluororesin type cation exchange membrane, a conductive diamond electrode is used as the anode, water is electrolyzed to evolve ozone from the anode and hydrogen from the cathode, capable of generating ozone stably at a high current efficiency for a long time by suppressing a consumption of fluororesin type cation exchange membrane.

Means for Solving Problem

In order to solve the problems, the present invention provides an ozone generator comprising an anode and a cathode provided on each side of a fluororesin type cation exchange membrane, the anode being a conductive diamond electrode having conductive diamond on the surface, wherein water is supplied to an anode compartment, DC current is supplied between the anode and the cathode to electrolyze water to evolve ozone from the anode compartment and hydrogen from a cathode compartment, the conductive diamond electrode comprising a substrate having a plurality of convexo-concave and a conductive diamond film coated on the surface of the substrate is applied as the conductive diamond electrode, a notch-less fluororesin type cation exchange membrane is closely adhered to the surface of the cathode and fixed to the electrolytic cell, and a close packed layer of ion exchange resin particles is closely adhered to the surface of the anode side of the fluororesin type cation exchange membrane.

As a second means to solve the problems according to the present invention, the ozone generator comprises a fluororesin type cation exchange membrane with a notch closely adhered to the surface of the anode side of the packed layer.

As a third means to solve the problems according to the present invention, an ozone generator comprises an anode and a cathode provided on each side of a fluororesin type cation exchange membrane, the anode being a conductive diamond electrode having conductive diamond on the surface, wherein water is supplied to an anode compartment, DC current is supplied between the anode and the cathode to electrolyze water to evolve ozone from the anode compartment and hydrogen from a cathode compartment, the conductive diamond electrode comprising a substrate having a plurality of convexo-concave and a conductive diamond film coated on the surface of the substrate is applied as the conductive diamond electrode, a notch-less fluororesin type cation exchange membrane is closely adhered to the surface of the cathode and fixed to the electrolytic cell, and an ion exchange membrane layer comprising a plurality of fluororesin type cation exchange membrane with notch is closely adhered to the surface of the anode side of the notch-less fluororesin type cation exchange membrane.

As a fourth means to solve the problems according to the present invention, the ozone generator comprises a fluororesin type cation exchange membrane with notch provided on the top surface of the anode side of the ion exchange membrane layer comprising a plurality of fluororesin type cation exchange membrane with notch, being fixed to the electrolytic cell.

As a fifth means to solve the problems according to the present invention, the ozone generator comprises a perfluorosulfonic acid cation exchange membrane as the fluororesin type cation exchange membrane.

As a sixth means to solve the problems according to the present invention, the ozone generator comprises fluororesin type ion exchange particles as the ion exchange resin particles.

Effect of the Invention

An ozone generator by the present invention is able to produce ozone stably for a long time with the consumption of a fluororesin type cation exchange membrane being suppressed.

BRIEF DESCRIPTION OF DRAWINGS

FIG. 1-2 A schematic diagram of the structure of another embodiment of an electrolytic cell for the ozone generator by the present invention, in Example 2

FIG. 1-3 A schematic diagram of the structure of yet another embodiment of an electrolytic cell for the ozone generator by the present invention, in Example 3

FIG. 1-4 A schematic diagram of the structure of yet another embodiment of an electrolytic cell for the ozone generator by the present invention, in Example 4

FIG. 2-1 An example of a fluororesin type cation exchange membrane viewed from the anode side of the ozone generator by the present invention, in Example 2

FIG. 2-2 Another example of a fluororesin type cation exchange membrane viewed from the anode side of the ozone generator by the present invention, in Example 4

FIG. 3-1 A surface view of an embodiment of the substrate of the conductive diamond electrode for the ozone generator by the present invention FIG. 3-2 A sectional view of an embodiment of the substrate of the conductive diamond electrode for the ozone generator by the present invention FIG. 4 A block diagram of an example of the ozone generator by the present invention FIG. 5 A schematic diagram of an embodiment of the electrolytic cell for the ozone generator used in Comparative Example 2

DESCRIPTION OF THE PREFERRED EMBODIMENTS

The following are detailed explanations, in reference to the figures, of an ozone generator by the present invention.

Figure 1:
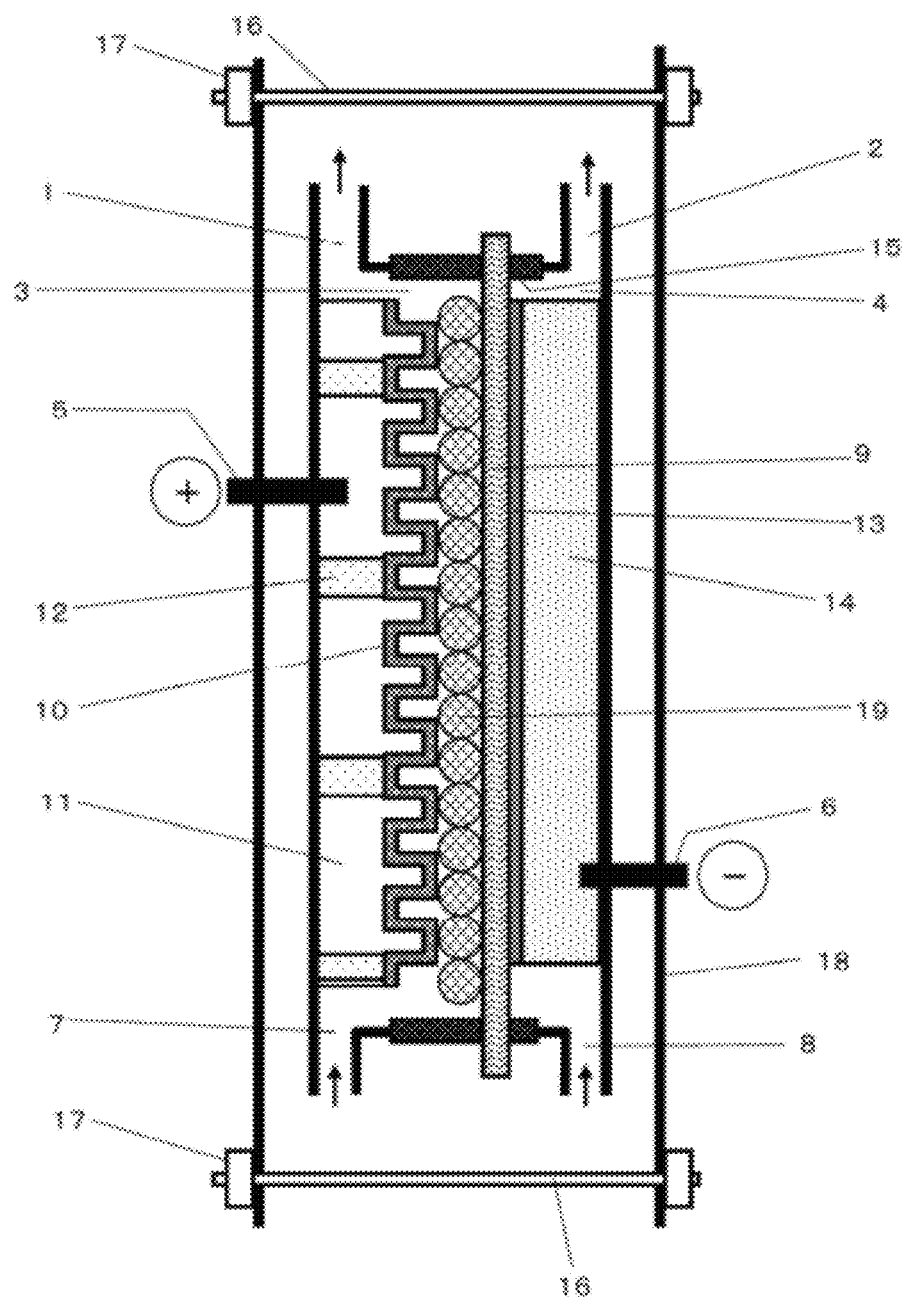
FIG. 1-1 A schematic diagram of the structure of an embodiment of an electrolytic cell for the ozone generator by the present invention, in Example 1

FIG. 1-1 is a schematic diagram of the structure of an embodiment of an electrolytic cell for the ozone generator by the present invention, in which 1: Anode compartment exit, 2: cathode compartment exit, 3: anode compartment, 4: cathode compartment, 5: anodic feed terminal, 6: cathodic feed terminal, 7: anode compartment supply channel, 8: cathode compartment supply channel, 9: notch-less fluororesin type cation exchange membrane, 10: conductive diamond film, 11: p-type silicon substrate with convexo-concave, 12: through hole, 13: cathode sheet, 14: cathodic current collector, 15: sealing material, 16: clamping bolt, 17: nut, 18: press plate, and 19: close packed layer of ion exchange resin particle.

The anode has a conductive diamond film 10 on the surface of the p-type silicon substrate with convexo-concave 11, provided with a through hole 12, and the cathode comprises a cathode sheet 13. A notch-less fluororesin type cation exchange membrane 9 is closely adhered to the surface of the cathode sheet 13. The notch-less fluororesin type cation exchange membrane 9 is fixed to the electrolytic cell with a sealing material 15. A close packed layer of ion exchange resin particles 19 is closely adhered to the surface of the anode side of a notch-less fluororesin type cation exchange membrane. The anode and the cathode are accommodated, respectively, in the anode compartment 3 and the cathode compartment 4. The anode compartment 3 and the cathode compartment 4 are, respectively, provided with the anode compartment exit 1, the cathode compartment exit 2 and the anode compartment supply channel 7 and the cathode compartment supply channel 8.

The connecting electric contact between respective structural members, the anode with the conductive diamond film 10 on the surface of the p-type silicon substrate with convexo-concave 11, the cathode comprising the cathode sheet 13, the cathodic current collector 14, and notch-less fluororesin type cation exchange membrane 9 is carried out by means of the clamping bolt 16, the nut 17, and the press plate 18. Applied contact pressure to the bolts and nuts is 3 N/m.

Pure water via the anode compartment supply channel 7 to the anode compartment 3 is supplied, via the through hole 12, to the contact surface of the conductive diamond film 10 with a close packed layer of ion exchange resin particles 19 on the surface of the notch-less fluororesin type cation exchange membrane 9, where electrolytic reactions occur. In the anode compartment 3, ozone gas, oxygen gas, and hydrogen ions evolve; ozone gas and oxygen gas are vented through the anode compartment exit 1 outside the electrolytic cell; hydrogen ions having migrated to the surface of the cathode sheet 13 via the notch-less fluororesin type cation exchange membrane 9 combine with electrons to form hydrogen gas; and the hydrogen gas is vented outside the electrolytic cell through the cathode compartment exit 2.

The cathode sheet 13 was manufactured in the following manner. PTFE dispersion (manufactured by Du Pont Mitsui Fluorochemicals 31-J) and aqueous dispersion liquid of platinum-loaded carbon catalyst are mixed and dried, to which solvent naphtha was added, followed by kneading. Through the rolling, drying and sintering processes, the cathode sheet 13 of PTFE 40%, platinum-loaded carbon catalyst 60%, 120 μm thick, and with porosity 55% was obtained.

The cathodic current collector is made of a stainless steel fibrous sintered body with 2.5 mm in thickness. (Manufactured by Tokyo Rope Mfg.)

As the ion exchange resin particles used for the close packed layer of ion exchange resin particles 19 in the present invention, fluororesin type ion exchange resin particles are preferable, in view of durability to ozone generated from electrolysis.

For the configuration of the electrolytic cell, the packing volume of the close packed layer of ion exchange resin particles 19 is determined from the consumption rate of the fluororesin type cation exchange membrane by electrolysis and an estimated life span of the electrolytic cell. In the present electrolytic cell, consumption of membrane starts from the notch-less fluororesin type cation exchange membrane 9 which is the nearest to the cathode side and the life span ends when the concentration of hydrogen which permeates into anode gas has reached 1 vol. % or more, which is one fourth of 4.5 vol. %, Lower Explosion Limit. From the product of a consumption rate of the membrane and hours of the expected life span, a necessary packing volume is obtained, based on which the electrolytic cell which fulfills an expected life span can be configured.

Figures 1, 2:
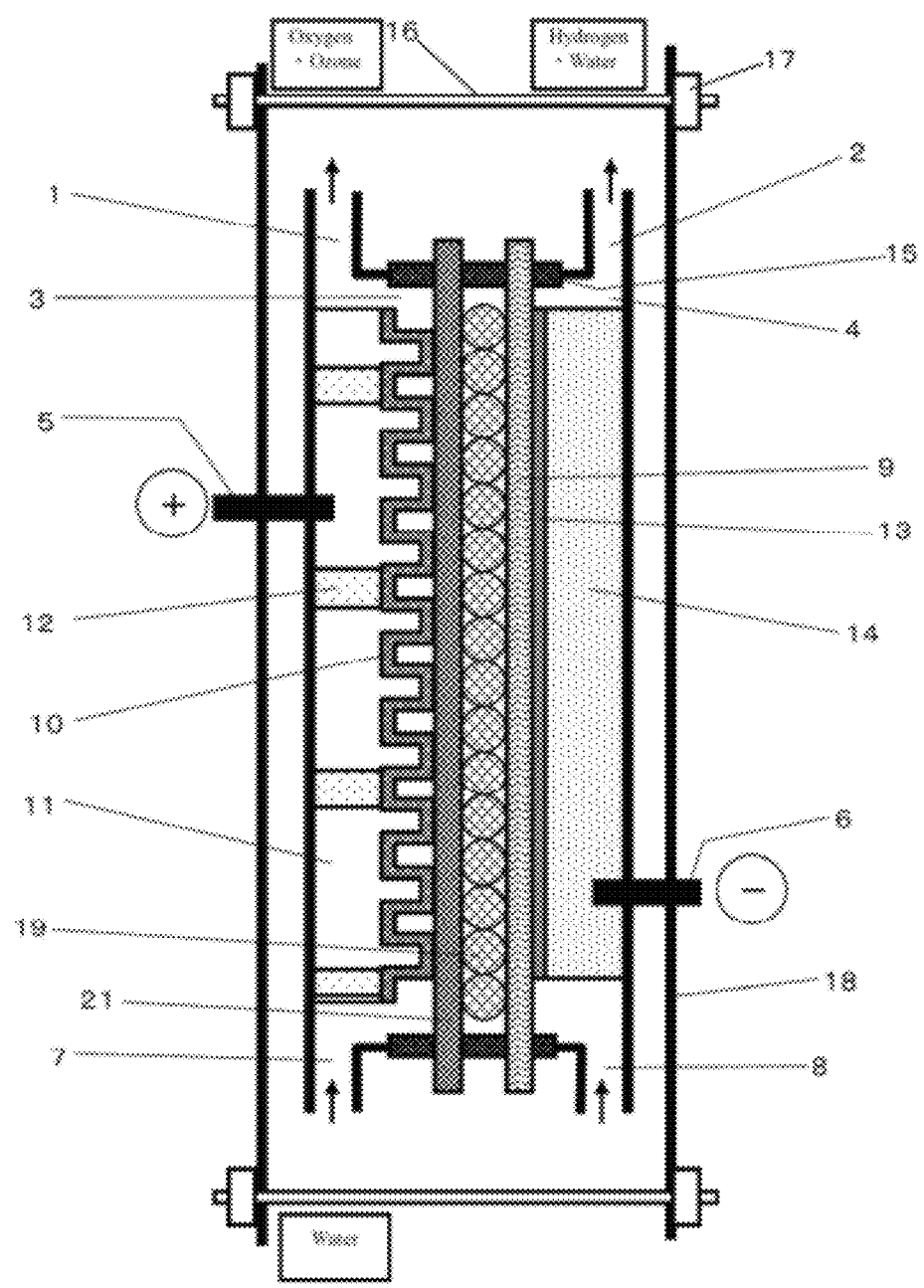

FIG. 1-2 is a schematic diagram of the structure of another embodiment of the electrolytic cell for the ozone generator by the present invention. It illustrates the embodiment in which fluororesin type cation exchange membrane 21 with the notch 20 is adhered to the surface of the anode side of the close packed layer of ion exchange resin particles 19, as shown in FIG. 2-1. The fluororesin type cation exchange membrane 21 with the notch 20 is fixed to the electrolytic cell with the sealing material 15.

In the electrolytic cell which realizes an ozone generator shown in FIG. 1-2, the fluororesin type cation exchange membrane 21 in contact with the anode can be provided by a plurality of sheet. Those other than the fluororesin type cation exchange membrane 9 disposed on the cathode side are provided with the notch 20 so that liquid or gas does not stagnate in the anode compartment 3. When hydrogen gas or oxygen gas permeated through the fluororesin type cation exchange membrane 21 stagnates in the close packed layer of ion exchange resin particles 19, the pressure in the anode compartment 3 increases, adherence among ion exchange resin particles, with each other, of the close packed layer of ion exchange resin particles 19 or of the fluororesin type ion exchange membranes, with each other, of the fluororesin type cation exchange membrane 9 & 21 or of the ion exchange membranes 9 or 21 to the ion exchange resin particles 19 decreases, and also the water content decreases. Then, the conductivity in the whole anode compartment 3 decreases, the cell voltage increases, and eventually no electrolysis reaction will be expected. In order to prevent such phenomena from occurring, all the fluororesin type cation exchange membranes 21 except the fluororesin type cation exchange membrane 9 which is located at the nearest to the cathode side and closely adhered to the cathode sheet 13 are provided with notches so that the permeated gas is vented to the side of the anode compartment 3, without stagnation.

According to the present invention, the notch 20 of the fluororesin type ion exchange membrane with notch 21 is allowed to be provided transversely by a plurality in number. The notches 20 are formed partially or entirely on the surface by a plurality in number, being arranged linearly, circularly, longitudinally, transversely, concentrically or irregularly, to further enhance the expected effect.

By making the notch 20 of the fluororesin type ion exchange membrane with notch 21 penetrated, the concentration of hydrogen in ozone-containing gas evolved from the anode compartment can be further decreased, and simultaneously the cell voltage rising can be prevented.

Figures 1, 2, 3:
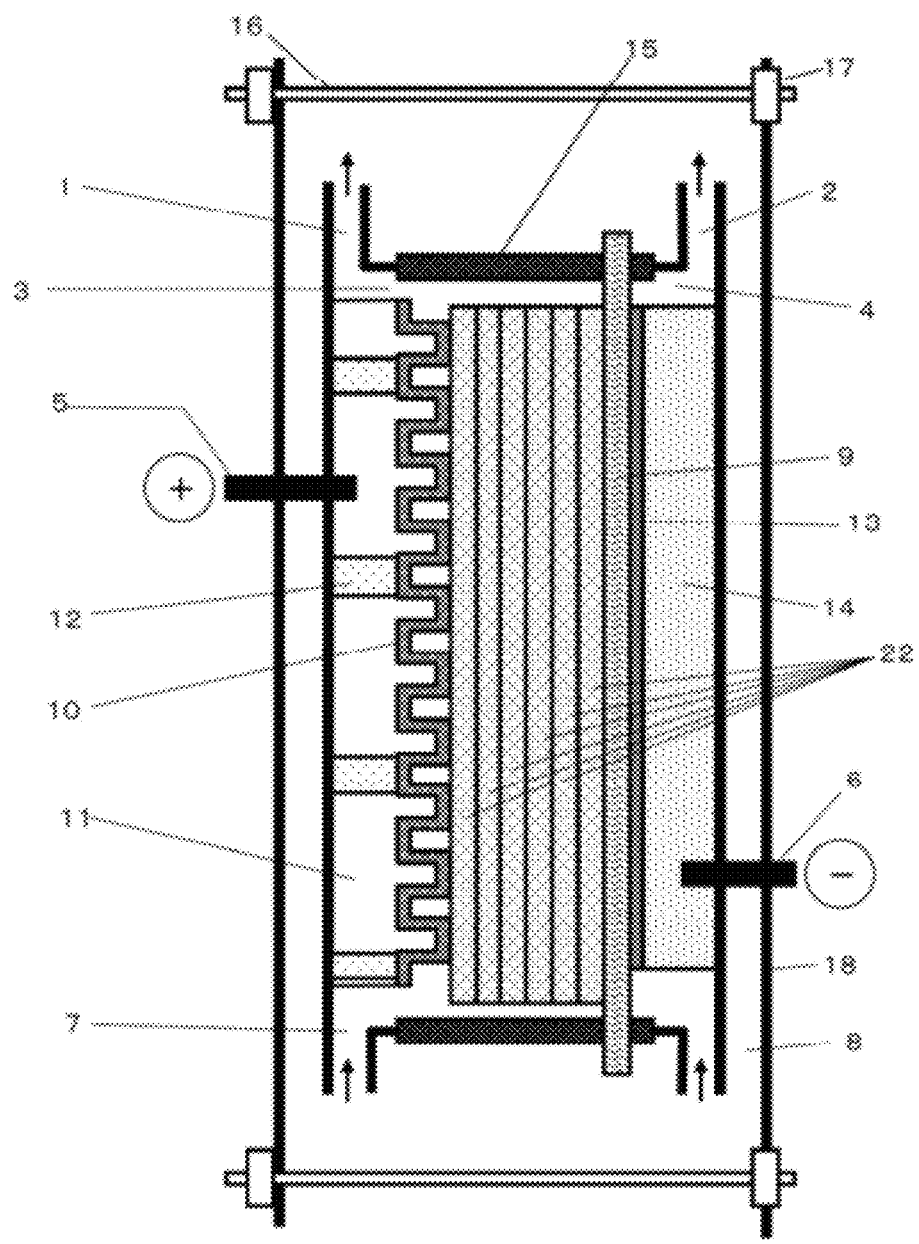

FIG. 1-3 is a schematic diagram of the structure of yet another embodiment of an electrolytic cell for the ozone generator by the present invention. It illustrates an embodiment of the ozone generator in which an anode and a cathode are provided on each side of a fluororesin type cation exchange membrane, the anode being a conductive diamond electrode having conductive diamond on the surface is applied, water is supplied to an anode compartment, DC current is supplied between the anode and the cathode to electrolyze water to evolve ozone from the anode compartment and hydrogen from a cathode compartment, the notch-less Fluororesin type cation exchange membrane 9 is adhered to the cathode surface, and fixed to the sealing material 15 of the electrolytic cell, and the ion exchange membrane layer 22 comprising a plurality of fluororesin type cation exchange membrane with notch is closely adhered to the surface of the anode side of the notch-less fluororesin type cation exchange membrane 9. The ion exchange membrane layer comprising a plurality of fluororesin type cation exchange membrane with notch 22 can achieves an effect equivalent to the close packed layer of ion exchange resin particles 19 shown in FIG. 1-1 and FIG. 1-2. The notch of the ion exchange membrane layer 22 is omitted and not shown.

For the configuration of the electrolytic cell, the number of the ion exchange membrane layers comprising a plurality of fluororesin type cation exchange membrane with notch 22 is determined from the consumption rate of the fluororesin type cation exchange membrane by electrolysis and an estimated life span of the electrolytic cell.

In the present electrolytic cell, consumption of membrane starts from the notch-less fluororesin type cation exchange membrane 9 which is the nearest to the cathode side and the life span ends when the concentration of hydrogen which permeates into anode gas has reached 1 vol. % or more, which is one fourth of 4.5 vol. %, Lower Explosion Limit. From the product of a consumption rate of the membrane and hours of the expected life span, a necessary number of the ion exchange membrane layers comprising a plurality of fluororesin type cation exchange membrane with notch 22 is obtained, based on which the electrolytic cell which fulfills an expected life span can be configured.

As the notch-less fluororesin type cation exchange membrane 9, the fluororesin type ion exchange membrane with notch 21 and a plurality of fluororesin type cation exchange membrane layers with notch 22 composing the ion exchange membrane layers, a commercially available perfluorosulfonic acid cation exchange membrane is applied. (Trade name: Nafion 117, manufactured by du Pont, Thickness shown in catalog: 175 μm). The membrane is immersed in boiled pure water for 30 minutes for water swelling treatment.

FIG. 1-4 is a schematic diagram of the structure of yet another embodiment of an electrolytic cell by the present invention. It illustrates that one sheet of the fluororesin type cation exchange membrane with notch 21 is fixed to the sealing material 15 of the electrolytic cell at the top surface of the anode side of the ion exchange membrane layers 22 comprising a plurality of fluororesin type cation exchange membrane with notch 20.

FIG. 2-2 is a view showing a structure of the fluororesin type cation exchange membrane viewed from the anode side in FIG. 1-4.

FIG. 3-1 and FIG. 3-2 show an embodiment of the anode having conductive diamond on the surface for the ozone generator by the present invention. A number of convexo-concave were formed at 0.5 mm pitch on the surface of 5×5 cm p-type silicon substrate (3 mm t) 11 by dicing and a plurality of through hole 12 were drilled from the rear face. For texture processing on the surface, the silicon substrate was immersed in a mixed acid solution prepared by 1:1 mixture of 35% hydrofluoric acid and 70% nitric acid for 5 minutes at a room temperature, followed by further immersion in an aqueous solution of 10% potassium hydroxide for 5 minutes at 60 degree Celsius. In the figures, 23 is the convex, and 24 is the concave. The silicon substrate was rinsed with water and dried. For the pretreatment, the substrate was dipped in the isopropyl alcohol in which diamond powder had been mixed, and ultrasonic wave was applied for seeding. Filming was made by the microwave plasma CVD (chemical vapor deposition) at 2.45 GHz, feeding $H_2$, $CH_4$, and $B_2H_6$ gases at a flow rate of 800 sccm, 20 sccm, 0.2 sccm, respectively and at 3.2 kPa of the gas pressure. The conductive diamond film 10 containing boron as dopant was prepared by the microwave plasma CVD. The total area of the convex top part, which is effective electrolysis area, is 6.25 cm2.

The convex 23 on the surface of the conductive diamond film 10 contacts both the perfluorosulfonic acid cation exchange membrane 9 and water phase, forming a triple phase boundary. In order to make the entire contact surface of the convex 23 and the perfluorosulfonic acid type cation exchange membrane 9 form the triple phase boundary, the convex 23 must have fine structure and also in order to make water intrude into the entire surface of the convex 23 and make electrolytic gases to be liberated from the electrochemical reaction field swiftly, the convex 23 must be 1 mm or less in width. In this way, if the number of the convex 23 is increased and the electrode surface is finely structured, the triple phase boundary is formed on the entire surface of the convex 23 and flow paths for the electrolyte and generated gases increase, allowing smooth flow of fluid.

On the other hand, if the convex 23 is widened to 2 mm or more, such area that no water always enters and therefore no electrochemical reactions occur will be formed in the middle part of the convex 23, in spite that the convex 23 contacts the perfluorosulfonic acid cation exchange membrane 9. Thus, in the area formed at the middle of the convex 23 where no water always enters and therefore no electrochemical reactions occur, once electrolysis operation starts, bubbles will cover the entire surface of the conductive diamond film 10, reducing the triple phase boundary to almost zero, rendering electrolysis to be impossible.

Whereas, in a zero-gap structure where the triple phase boundary is obtained by applying pressure to make the ion exchange membrane contact the electrode, if the convex 23 is too fine, the convex 23 becomes fragile. Therefore, the convex 23 is required to be 0.2 mm or more in width.

In addition, to make water enter the entire surface of the convex 23 and the fine triple phase boundary be formed over the entire surface of the convex 23, it is necessary for the surface of the convex 23 to have proper roughness, that is, Ra: 0.1 µm or more. On the other hand, if the surface roughness Ra is too large, the perfluorosulionic acid cation exchange membrane becomes fragile, and in view of this, the surface roughness Ra is required to be 10 µm or less, preferably in the range of 0.2-0.5 µm.

For saving the manufacturing cost of the conductive diamond electrode by the present invention, it is necessary to apply machine processing including dicing or drilling capable of manufacturing the convex concave structure without applying various precision processing apparatuses.

Also, it is effective for the substrate 11 to have multiple numbers of the through hole 12 so that gas vented from the surface of the convex 23 to the concave 24 or water supplied to the surface of the convex 23 can smoothly leave from the back of the electrode.

For the conductive diamond electrode, an applicable shape of each convex 23 of the convex and concave may include any of circle, ellipse, polygon, and others.

It is also possible to provide the same effect by providing the substrate with multiple striped patterns over the entire surface of the conductive diamond electrode disposed at an interval of the gap, the surface of the substrate of each stripe being coated with the diamond film, the substrate width being ranged from 0.2 mm to 1 mm, instead of providing multiple numbers of the substrate 11 with convex and concave processing.

Instead of a plurality of the substrate with multiple stripe patterns, a substrate with projections in a shape including angular, circular, and other bristling in all directions may also be used.

The anode having the conductive diamond film 10 on its surface is manufactured by loading diamond, as carbon source, which is reduction deposit of organic compounds, on the electrode substrate. The material and the shape of the electrode substrate are not specifically restricted as far as the material is conductive, and can be either in plate, mesh, or porous plate, for instance, of bibili fiber sintered body, comprising conductive silicon, silicon carbide, titanium, niobium and molybdenum, and as material, use of conductive silicon or silicon carbide with a similar thermal expansion rate to the conductive diamond is especially preferable. Moreover, in order to enhance adherence between the conductive diamond and the substrate, and also to increase the surface area of the conductive diamond film to lower the current density per unit area, the surface of the substrate should preferably be rough to a certain extent.

When the conductive diamond is used in film state, the thickness of film should preferably be 10 µm-50 µm to increase durability and to reduce pin-hole development. A self-supported membrane of 100 µm or more in thickness is also applicable for better durability, but cell voltage becomes too high, rendering the temperature control of electrolyte to be more complicated.

The method to load the conductive diamond film to the substrate has no specific limitation and is optional from among conventional methods. Typical manufacturing methods of the conductive diamond electrode include the hot filament CVD (chemical deposition), microwave plasma CVD, plasma arcjet, and physical vapor deposition method (PVD), among which the microwave plasma CVD is preferable in view of a higher film-making rate and uniform film preparation available. Also applicable is a diamond electrode with synthetic diamond powder manufactured under an extra high pressure supported on the substrate using binding agents like resins.

The microwave plasma CVD method is the process in which the hydrogen-diluted mixture gas of carbon source like methane and dopant source like borane is introduced into the reaction chamber, connected with a microwave transmitter via a waveguide, in which a film forming substrate of conductive diamond, such as conductive silicon, alumina and silicon carbide is disposed, so that plasma is generated within the reaction chamber to develop conductive diamond on the substrate. By microwave plasma, ions little oscillate and chemical reaction is promoted at a pseudo-high temperature condition where only electrons are made oscillated. Output of plasma is 1-5 kW, the larger the output, the more the active species can be generated and the rate of diamond growth accelerated. Advantage of using plasma lies in the fact that diamond filming is possible at a high speed on a substrate with a large surface area.

For providing conductivity to diamond, a trace amount of elements having different atomic values is added. The content of boron or phosphorus is preferably 1-100000 ppm, or more preferably 100-10000 ppm. As the raw material for this additive element, boron oxide or diphosphorus pentoxide, which is less toxic, is applicable. The conductive diamond, thus manufactured and loaded on the substrate, can be connected to the current collector comprising conductive substances, such as titanium, niobium, tantalum, silicon, carbon, nickel and tungsten carbide, in a configuration of flat plate, punched plate, metal mesh, powder-sintered body, metal fiber, and metal fiber-sintered body.

The cathode 13 sheet is manufactured in the following manner. PTFE dispersion (manufactured by Du Pont Mitsui Fluorochemicals 31-J) and aqueous dispersion liquid of platinum-loaded carbon catalyst were mixed and dried, to which solvent naphtha is added, followed by kneading. Through the rolling, drying and sintering processes, the cathode sheet 13 of PTFE 40%, platinum-loaded carbon catalyst 60%, 120 µm thick, and with porosity 55% was obtained.

The cathodic current collector was made of a stainless steel fibrous sintered body with 2.5 mm in thickness. (manufactured by Tokyo Rope Mfg.)

EXAMPLES

The following are exemplary embodiments of the present invention and comparative examples. Provided, however, the present invention shall not be limited to these exemplary embodiments.

Example 1

The electrolytic cell was configured as shown in FIG. 1-1. The notch-less fluororesin type cation exchange membrane 9 was adhered to the surface of the cathode sheet 13, and fixed to the sealing material 15 of the electrolytic cell, and the close packed layer of ion exchange resin particles 19 was closely adhered to the surface of the anode side of the notch-less fluororesin type cation exchange membrane 9. The anode and the cathode are accommodated in the anode compartment 3 and the cathode compartment 4, respectively. The anode compartment 3 and the cathode compartment 4 are equipped with the anode compartment supply channel 7 and the cathode compartment supply channel 8, and the anode compartment exit 1 and the cathode compartment exit 2, respectively.

The ion exchange resin particles packed in the close packed layer 19 were prepared in such way that ion exchange resin (manufactured by Du Pont, Trade name: NR50) was boiled and immersed in pure water for 30 minutes for the swelling treatment.

The anode comprising the conductive diamond electrode was immersed in a mixed acid solution prepared by 1:1 mixture of 35% hydrofluoric acid and 70% nitric acid for 5 minutes at a room temperature for texture processing on the surface of a 5 cm×5 cm p-type silicon substrate (3 mm t), followed by further immersion in an aqueous solution of 10% potassium hydroxide for 5 minutes at 60 degrees Celsius. The surface roughness Ra of the applied silicon substrate was in a range from 0.1 μm to 4 μm, with some local unevenness.

Many convexo-concave shapes were formed on the surface by dicing using a diamond saw. The diamond saw with 20 μm in thickness was used for manufacturing each sample.

The prepared silicon substrate in convexo-concave shape was rinsed with water and dried. For the pretreatment, the substrate was dipped in the isopropyl alcohol in which diamond powder had been mixed, and ultrasonic wave was applied for seeding. Filming was made by the plasma CVD at 2.45 GHz. As gases, $H_2$, $CH_4$, $B_2H_6$ were supplied at a flow rate of 800 sccm; 20 sccm, 0.2 sccm, respectively and at 3.2 kPa of the gas pressure. The conductive diamond film containing boron as dopant was prepared by the microwave plasma CVD.

This conductive diamond electrode is covered with the diamond film 10 having numerous convexo-concave s over the entire surface of the substrate 11 as shown in FIG. 3-1 and FIG. 3-2, with each convex 23 being shaped in square form. The substrate 11 has a plurality of through holes 12 so that gases vented from the surface of the convex 23 to the concave 24 or water supplied to the surface of the convex 23 can circulate smoothly from the rear of the electrode. The total surface area of the convex, constituting an effective electrolytic area, was 6.25 $cm^2$.

The sum of area of the opening part of the through holes was 10% of the projected area of the electrode structure. The surface roughness Ra of the convex is in a range from 0.2 um to 0.5 um.

PTFE dispersion (manufactured by Du Pont Mitsui Fluorochemicals 31-J) and aqueous dispersion liquid of platinum-loaded carbon catalyst were mixed and dried, to which solvent naphtha was added, followed by kneading. Through the rolling, drying and sintering processes, the cathode sheet 13 of PTFE 40%, platinum-loaded carbon catalyst 60%, 120 μm thick, and with porosity 55% was obtained.

The cathodic current collector 14 was made of a stainless steel fibrous sintered body with 2.5 mm in thickness. (manufactured by Tokyo Rope Mfg.)

Figures 1, 2, 3, 4:
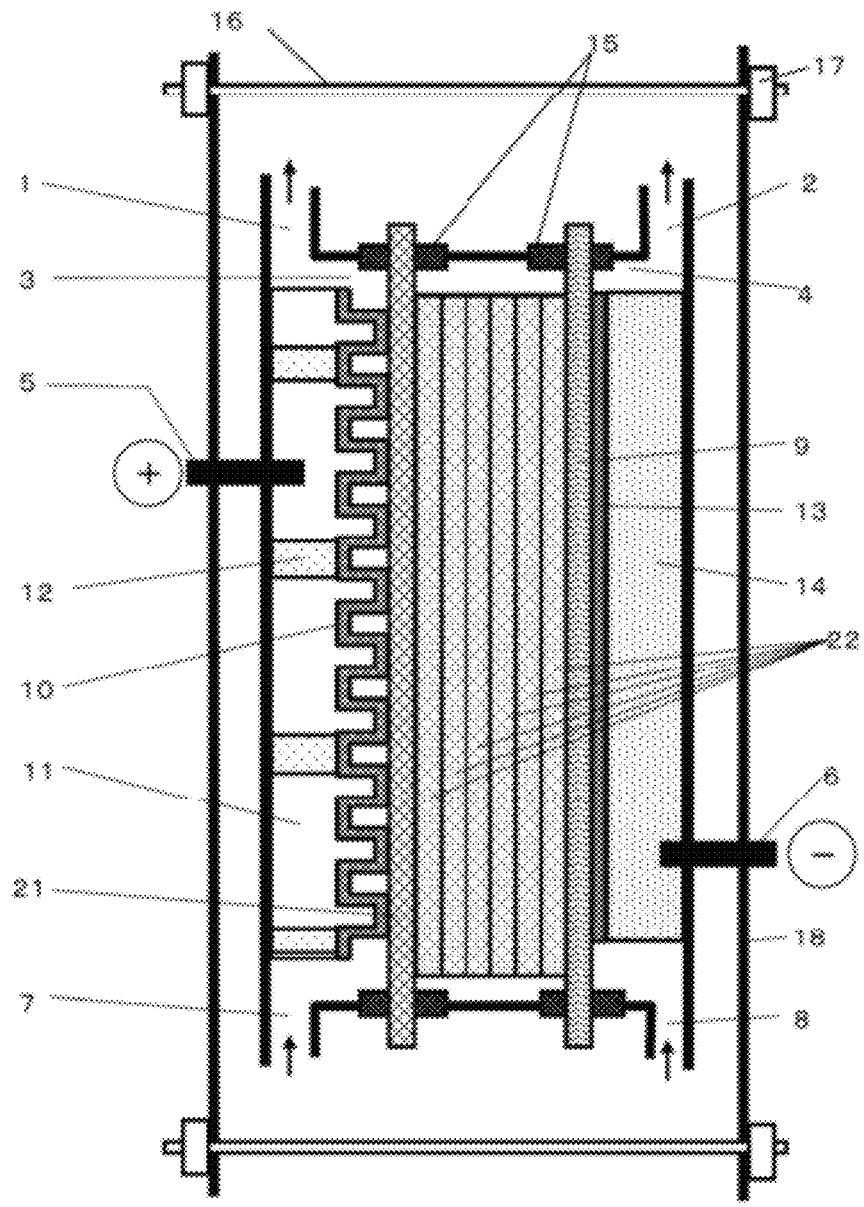
Figures 1, 2:
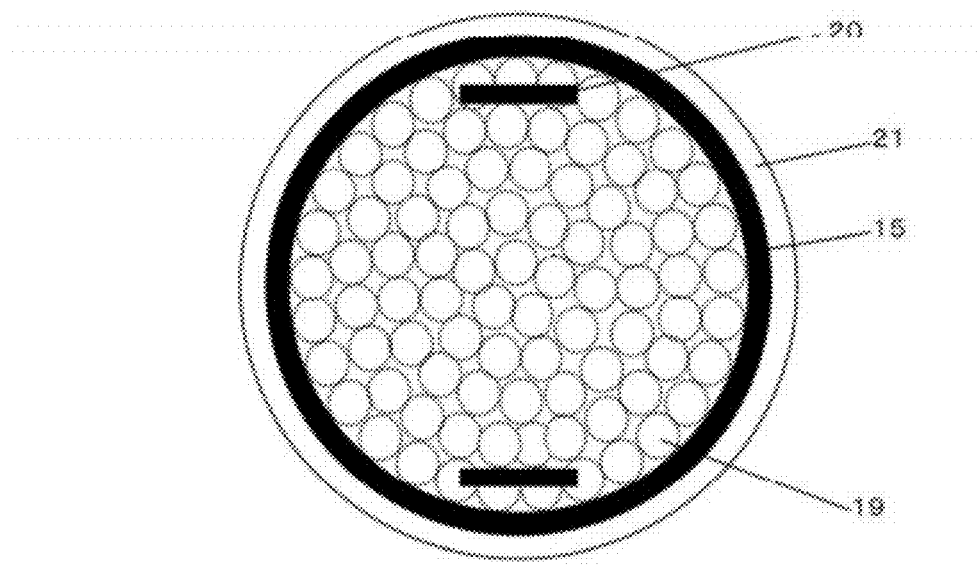
Figure 2:
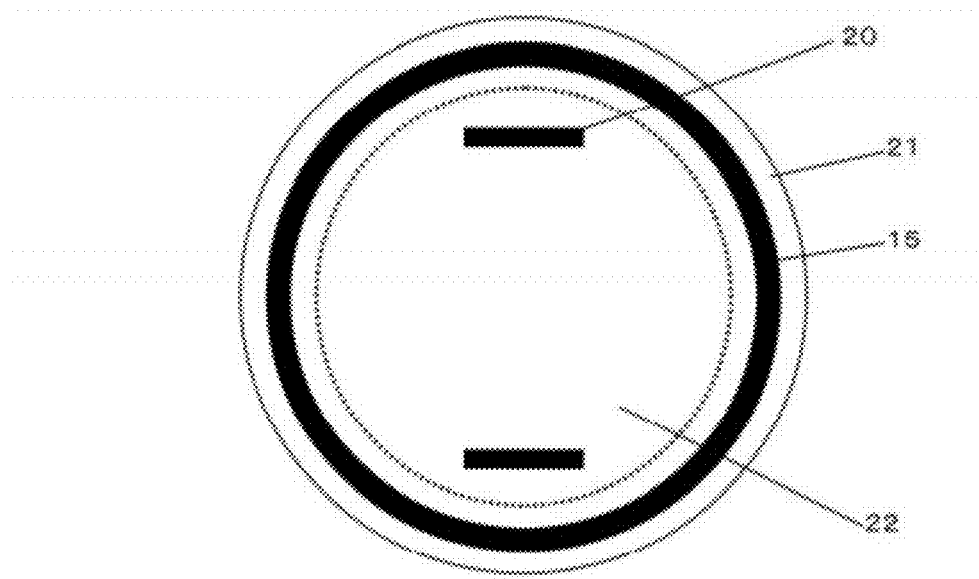
Figure 4:
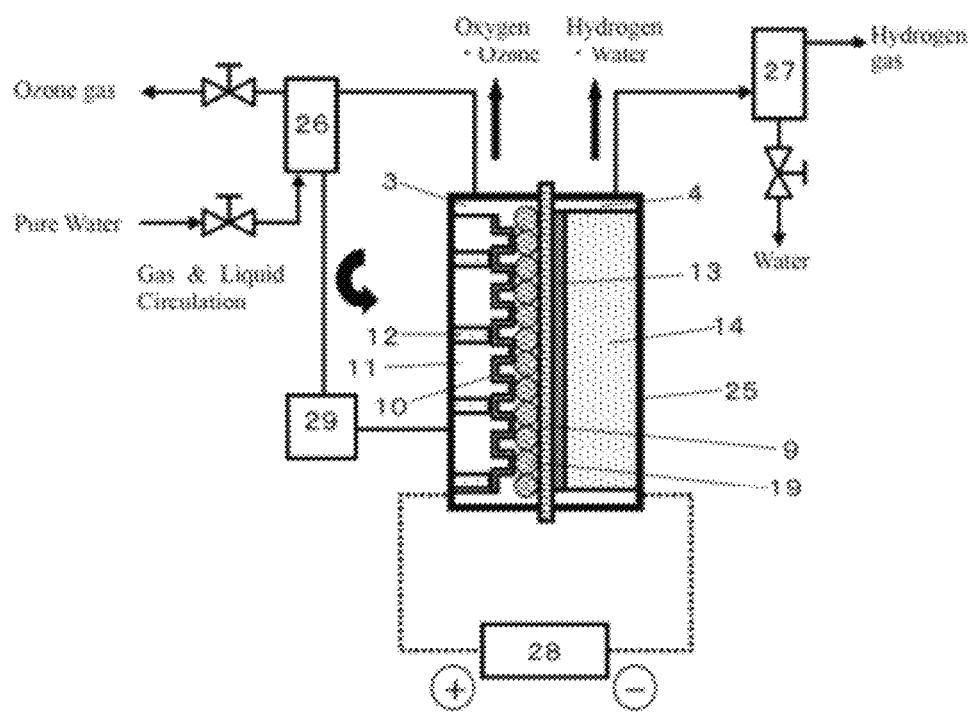

As shown in FIG. 4, the electrolytic cell 25 was connected to the anode side gas liquid separator 26, the cathode side gas liquid separator 27 and the DC power source 28, and carried out water electrolysis operation. The electrolysis current was 6.25 A. At the start of operation, the temperature of pure water as electrolyte in the anode compartment was 23 degrees Celsius and water electrolysis was performed without cooling.

When current was supplied from the DC power source 28, mixed gas of ozone and oxygen evolved from the anode and hydrogen gas evolved from the cathode. Electrolysis of pure water was conducted at 6.25 A (1 A/$cm^2$) of the feed current.

Feed water was supplied to the electrolytic cell 25 at a temperature of 25-30 degrees Celsius controlled by the heat exchanger 29.

The connection of electric contact between respective structural members and each electrode to the fluororesin type cation exchange membrane was carried out by means of the clamping bolts and nuts of the cell press plate. Applied contact pressure to the bolts and nuts was 3 N/m.

The test results were summarized in Table 1. At the time of operation start, the current efficiency of ozone generation was 20%, the hydrogen gas content in the anode gas was 0.1 vol. %, and the cell voltage was 11.8V. In the 10 days consecutive electrolysis operation, the current efficiency of ozone generation was 18%, the hydrogen gas content in the anode gas was 0.1 vol. %, and the cell voltage was 11.7V, showing no significant change.

TABLE 1-1

|  | Example 1 ||| Example 2 ||| Example 3 ||| Example 4 |||
| --- | --- | --- | --- | --- | --- | --- | --- | --- | --- | --- | --- | --- |
|  | $O_3$CE % | $H_2/O_2$ Vol % | CV V | $O_3$CE % | $H_2/O_2$ Vol % | CV V | $O_3$CE % | $H_2/O_2$ Vol % | CV V | $O_3$CE % | $H_2/O_2$ Vol % | CV V |
| At the time of operation start | 20 | 0.1 | 11.8 | 20 | 0.1 | 12 | 20 | 0.1 | 11.8 | 20 | 0.1 | 12.1 |
| After 1 day |  |  |  |  |  |  |  |  |  |  |  |  |
| After 2 day |  |  |  |  |  |  |  |  |  |  |  |  |
| After 3 day | 18 | 0.1 | 11.8 | 17 | 0.1 | 11.9 | 19 | 0.1 | 11.7 | 19 | 0.1 | 12 |
| After 10 day | 18 | 0.1 | 11.7 | 18 | 0.1 | 11.9 | 18 | 0.1 | 11.7 | 18 | 0.1 | 11.9 |
| After 20 day | 18 | 0.1 | 11.7 | 18 | 0.1 | 11.9 | 18 | 0.1 | 11.7 | 18 | 0.1 | 11.9 |

TABLE 1-2

|  | Comparison Example 1 |||| Comparison Example 2 |||
| --- | --- | --- | --- | --- | --- | --- | --- |
|  | $O_3$CE % | $H_2/O_2$ Vol % | CV V | I A | $O_3$CE % | $H_2/O_2$ Vol % | CV V |
| At the time of operation start | 20 | 0.1 | 12 | 6.25 | 20 | 0.1 | 12 |
| After 1 day | 18 | 0.1 | 15 | 6.25 | 18 | 0.6 | 11.8 |
| After 2 day | 17 | 0.1 | 24 | 6.25 | 18 | 1.7 | 11.7 |
| After 3 day | no gas evolution | no gas evolution | 24 | 0 | 18 | 4 | 11.7 |

Example 2

Electrolysis tests were conducted with the electrolytic cell as shown in FIG. 1-2. To the surface of the anode side of the close packed layer of ion exchange resin particles 19, the fluororesin type cation exchange membrane 21 with notch 20 was closely adhered as shown in FIG. 2-1. The fluororesin type cation exchange membrane 21 with notch 20 is fixed to the sealing material 15.

As the fluororesin type cation exchange membrane 9, 21, commercially available fluororesin type cation exchange membranes (Trade name: Nafion 117, manufactured by Du Pont, Thickness shown in catalog: 175 μm) were used. The membrane was immersed in boiled pure water for 30 minutes for water swelling treatment.

PTFE dispersion (manufactured by Du Pont Mitsui Fluorochemicals 31-J) and aqueous dispersion liquid of platinum-loaded carbon catalyst were mixed and dried, to which solvent naphtha was added, followed by kneading. Through the rolling, drying and sintering processes, the cathode sheet 13 of PTFE 40%, platinum-loaded carbon catalyst 60%, 120 μm thick, and with porosity 55% is obtained.

The cathodic current collector 14 was made of a stainless steel fibrous sintered body with 2.5 mm thickness. (Manufactured by Tokyo Rope Mfg.)

Ion exchange membrane resin particles packed in close packed layer 19 were prepared by boiling ion exchange resin (Trade name: NR50, manufactured by Du Pont), followed by immersion in boiled pure water for 30 minutes for water swelling treatment.

The applied anode was a conductive diamond electrode as with Example 1 and the electrolysis test was conducted as with Example 1.

The test results as shown in Table 1 were obtained. At the time of operation start, the current efficiency of ozone generation was 20%, the hydrogen gas content in the anode gas was 0.1 vol. %, and the cell voltage was 12V. In the 10 days consecutive electrolysis operation, the current efficiency of ozone generation was 18%, the hydrogen gas content in the anode gas was 0.1 vol. %, and the cell voltage was 11.9V, showing no significant change.

Example 3

Electrolysis tests were conducted with the electrolytic cell as shown in FIG. 1-3. To the surface of the cathode, the notch-less fluororesin type cation exchange membrane 9 was closely adhered and fixed to the sealing material 15. To the surface of the anode side of the notch-less fluororesin type cation exchange membrane 9, the ion exchange membrane layer 22 comprising 15 sheets of fluororesin type cation exchange membrane was closely adhered.

Except the features as above, the electrolytic cell was built up as with Example 1 and electrolysis tests were conducted.

The test results shown in Table 1 were obtained. At the time of operation start, the current efficiency of ozone generation was 20%, the hydrogen gas content in the anode gas was 0.1 vol. %, and the cell voltage was 11.8V. In the 10 days consecutive electrolysis operation, the current efficiency of ozone generation was 18%, the hydrogen gas content in the anode gas was 0.1 vol. %, and the cell voltage was 11.7V, showing no significant change.

Example 4

Electrolysis tests were conducted with the electrolytic cell as shown in FIG. 1-4. To the top surface on the anode side of the ion exchange membrane layer 22 comprising a plurality of fluororesin with notch 20, used in Example 3, the fluororesin type cation exchange membrane 21 with notch 20 was fixed to the seal material 15.

Except the features as above, the electrolytic cell was built up as with Example 1 and electrolysis tests were conducted.

The test results as shown in Table 1 were obtained. At the time of operation start, the current efficiency of ozone generation was 20%, the hydrogen gas content in the anode gas was 0.1 vol. %, and the cell voltage was 12.1V. In the 10 days consecutive electrolysis operation, the current efficiency of ozone generation was 18%, the hydrogen gas content in the anode gas was 0.1 vol. %, and the cell voltage was 11.9V, showing no significant change.

Comparative Example 1

In the electrolytic cell shown in FIG. 1-2 used in Example 2, the notch-less fluororesin type cation exchange membrane was applied in rue of the fluororesin type cation exchange membrane 21 with notch 20 as the fluororesin type cation exchange membrane being in contact with the anode.

Except the features as above, the electrolytic cell was built up as with Example 1 and electrolysis tests were conducted.

The test results as shown in Table 1 were obtained. At the time of operation start, the current efficiency of ozone generation was 20%, the hydrogen gas content in the anode gas was 0.1 vol. %, and the cell voltage was 12V. However, the cell voltage gradually increased and reached 24V in the second day, which is the upper limit voltage of the DC power source applied in the present tests. In the continued electrolysis operation, the current value gradually decreased and reached 0 A in the electrolysis operation of the 3 consecutive days. In the disassembling observation of the area formed between the notch-less fluororesin type ion exchange membranes in contact with the cathode and the notch-less fluororesin type ion exchange membranes in contact with the anode, gas accumulation was found in the area. Non power supply may be attributed to increased electric resistance resulting from a decrease in water content of the ion exchange resin in the area or poor contact among the ion exchange resins, or between the ion exchange resins and the fluororesin type cation exchange membrane.

Comparison Example 2

Figure 5:
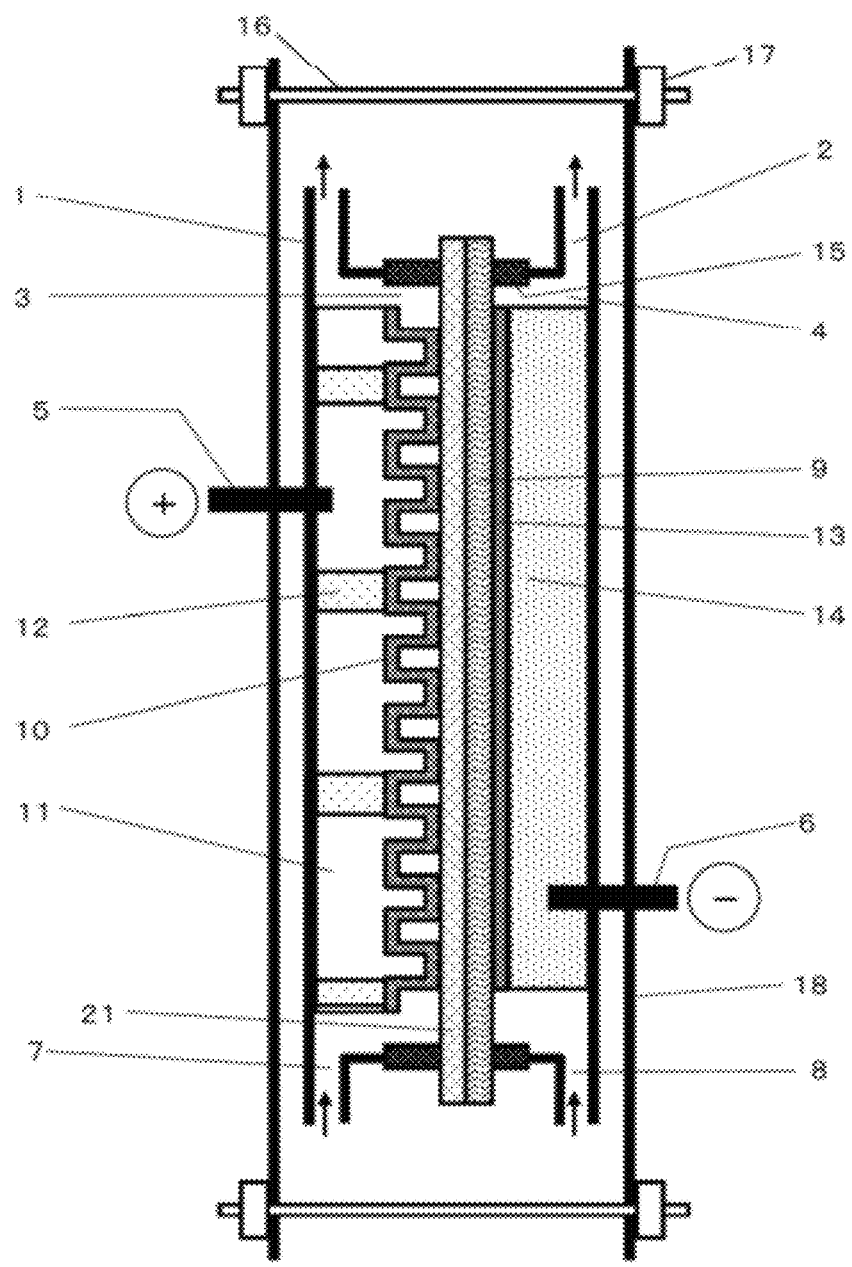

In Comparative Example 2, the electrolytic cell as shown in FIG. 5 was configured, in which two sheets consisting of the fluororesin type cation exchange membrane 9, 21 were closed adhered with each other. The fluororesin type cation exchange membrane 21 contacting the anode is provided with the notch 20.

Except the features as above, the electrolytic cell was built up as with Example 1 and electrolysis tests were conducted.

The test results as shown in Table 1 were obtained. At the time of operation start, the current efficiency of ozone generation was 20%, the hydrogen gas content in the anode gas was 0.1 vol. %, and the cell voltage was 12V. However, the concentration of hydrogen gas contained the anode gas gradually increased and reached 4 vol. % in the operation of the 3 consecutive days and the cell voltage reached 11.7 V, and eventually around the lower explosion limit (4.5 vol. %) of hydrogen in the oxygen gas.

In the disassembling observation of the fluororesin type cation exchange membrane, holes resulting from consumption were found in fluororesin type cation exchange membrane in contact with the anode at the contact area with the convex on the conductive diamond electrode. The convex was penetrated and came into contact with the fluororesin type cation exchange membrane in contact with the cathode, which also was consumed. The sharp increase of the hydrogen concentration in oxygen gas may be attributed to the increased hydrogen permeation from the cathode to the anode because of the thinned fluororesin type cation exchange membrane between the anode and the cathode.

INDUSTRIAL APPLICABILITY

The ozone generator by the present invention suppresses consumption of the fluororesin type cation exchange membrane and can maintain stable operation for a long time and therefore the sterilization and discoloring method utilizing ozone can be used in such facilities as waterworks and sewage plants.

FIGURE LEGEND

1: Anode compartment exit
2: cathode compartment exit
3: anode compartment
4: cathode compartment
5: anodic feed terminal
6: cathodic feed terminal
7: anode compartment supply channel
8: cathode compartment supply channel
9: notch-less fluororesin type cation exchange membrane
10: conductive diamond film
11: p-type silicon substrate with convexo-concave
12: through hole
13: cathode sheet
14: cathodic current collector
15: sealing material
16: clamping bolt
17: nut
18: press plate
19: close packed layer of ion exchange resin particles
20: notch
21: fluororesin type cation exchange membrane with notch
22: ion exchange membrane layer comprising a plurality of fluororesin type cation exchange membrane
23: convex
24: concave
25: electrolytic cell
26: anode side gas liquid separator
27: cathode side gas liquid separator
28: DC power source for electrolysis
29: heat exchanger

The invention claimed is:

1. An ozone generator comprising an anode and a cathode provided on each side of a fluororesin type cation exchange membrane,
   wherein the anode is a conductive diamond electrode having conductive diamond on a surface of the anode,
   water is supplied to an anode compartment comprising the anode,
   DC current is supplied between the anode and the cathode so as to electrolyze water and evolve ozone from the anode compartment and hydrogen from a cathode compartment comprising the cathode,
   the conductive diamond electrode comprises: a substrate having a plurality of convexo-concave formed in a pattern having regular intervals, and the plurality of convexo-concave are arranged in two mutually perpendicular axes; and a conductive diamond film coated on a surface of the substrate,
   a notch-less fluororesin type cation exchange membrane is closely adhered to a surface of the cathode and fixed to an electrolytic cell, and
   a close packed layer of ion exchange resin particles is closely adhered to a surface at an anode side of the notch-less fluororesin type cation exchange membrane.

2. The ozone generator according to claim 1, wherein the ozone generator further comprises a fluororesin type cation exchange membrane having at least one notch closely adhered to a surface at an anode side of the packed layer.

3. The ozone generator according to claim 1, wherein the ozone generator comprises a perfluorosulfonic acid cation exchange membrane as the fluororesin type cation exchange membrane.

4. The ozone generator according to claim 1, wherein the ozone generator comprises fluororesin type ion exchange particles as the ion exchange resin particles.

5. An ozone generator comprising an anode and a cathode provided on each side of a fluororesin type cation exchange membrane,
   wherein the anode is a conductive diamond electrode having conductive diamond on its surface,
   water is supplied to an anode compartment comprising the anode,
   DC current is supplied between the anode and the cathode so as to electrolyze water and evolve ozone from the anode compartment and hydrogen from a cathode compartment comprising the cathode,
   the conductive diamond electrode comprises: a substrate having a plurality of convexo-concave formed in a pattern having regular intervals, and the plurality of convexo-concave are arranged in two mutually perpendicular axes; and a conductive diamond film coated on a surface of the substrate,
   a notch-less fluororesin type cation exchange membrane is closely adhered to a surface of the cathode and fixed to an electrolytic cell, and
   an ion exchange membrane layer comprising a plurality of fluororesin type cation exchange membranes, each having at least one notch, is closely adhered to a surface at an anode side of the notch-less fluororesin type cation exchange membrane.

6. The ozone generator according to claim 5,
   wherein the ozone generator further comprises a fluororesin type cation exchange membrane having at least one notch, which is provided on a top surface at the anode side of the ion exchange membrane layer comprising the plurality of the fluororesin type cation exchange membranes having at least one notch, and which is fixed to the electrolytic cell.

7. The ozone generator according to claim 5, wherein the ozone generator comprises a perfluorosulfonic acid cation exchange membrane as the fluororesin type cation exchange membrane.

* * * * *